United States Patent [19]

Kawano et al.

[11] Patent Number: 5,532,032
[45] Date of Patent: Jul. 2, 1996

[54] RECORDING METHOD FOR AN OPTICAL RECORDING MEDIUM

[75] Inventors: Kumi Kawano; Fumio Matsui, both of Saitama-ken, Japan

[73] Assignee: Pioneer Electronic Corporation, Tokyo, Japan

[21] Appl. No.: 183,309

[22] Filed: Jan. 19, 1994

[30] Foreign Application Priority Data

Jan. 22, 1993 [JP] Japan .................. 5-009525

[51] Int. Cl.⁶ .................................................. B32B 3/00
[52] U.S. Cl. ................... 428/64.1; 428/64.2; 428/64.4; 428/64.8; 428/913; 430/270.15; 430/495.1; 430/945; 369/283; 369/288
[58] Field of Search ................ 428/64, 65, 457, 428/913, 64.1, 64.2, 64.4, 64.8; 430/270, 495, 945; 346/76 L, 135.1; 369/283, 288

[56] References Cited

U.S. PATENT DOCUMENTS

| | | | |
|---|---|---|---|
| 5,009,986 | 4/1991 | Kawaguchi | 430/945 |
| 5,019,476 | 5/1991 | Kanno et al. | 430/20 |
| 5,132,153 | 7/1992 | Hirose | 428/64 |
| 5,161,150 | 11/1992 | Namba | 369/275.4 |

*Primary Examiner*—Patrick J. Ryan
*Assistant Examiner*—Elizabeth Evans
*Attorney, Agent, or Firm*—Nikaido, Marmelstein, Murray & Oram

[57] ABSTRACT

An optical recording medium has a substrate and a recording film, which contains coloring matter, provided on the substrate. The recording film is irradiated with a laser beam passing through the substrate so that substances of the coloring matter are aggregated with each other.

6 Claims, 7 Drawing Sheets

RECORDING METHOD FOR AN OPTICAL RECORDING MEDIUM

BACKGROUND OF THE INVENTION

The present invention relates to a recording method for an optical recording medium, and more particularly to a recording method for an optical recording medium which has a recording film containing coloring matter.

An optical recording medium has a large storage capacity, and writing and reading operations of information are performed with a non-contact method using an optical pickup.

As a recording method of the optical recording medium, there is known a method for making a hole in a recording film by a laser beam and a method for using a phase change between crystalline structure and amorphous structure of the material of the recording film or a Kerr effect.

In a method for making a hole on the recording medium, a laser beam is focused on the recording film at a small area and converted into thermal energy so that the characteristic of the recording film is changed to form a pit. The contrast between the pit and the area other than the pit is detected as an electric signal.

In the method using the phase change, if the recording film is irradiated with the laser beam, the film changes from an amorphous state to a crystalline state for recording information. The reflectivity of the recording film is small at the crystalline state portion and large at the amorphous state portion. Thus, the information is reproduced by detecting the difference of reflectance between portions.

However, in the method for making a hole, jitter is increased. Since a large energy is used for making a hole, it is difficult to improve recording sensitivity.

Since the phase change method is a heat mode recording method, the boundary between the changed surface and the unchanged surface is not clearly distinguishable and hence jitter is increased.

SUMMARY OF THE INVENTION

An object of the present invention is to provide a recording method for an optical recording medium in which information is recorded by a laser beam at a low power with a high recording sensitivity, thereby providing a recorded disc wherein jitter is reduced.

According to the present invention, there is provided a recording method for an optical recording medium having a substrate and a recording film, which contains coloring matter, provided on the substrate, wherein the method comprises irradiating the recording film with a laser beam passing through the substrate so that substances of the coloring matter are aggregated with each other.

DETAILED DESCRIPTION OF THE PREFERRED EMBODIMENT

Figure 1:
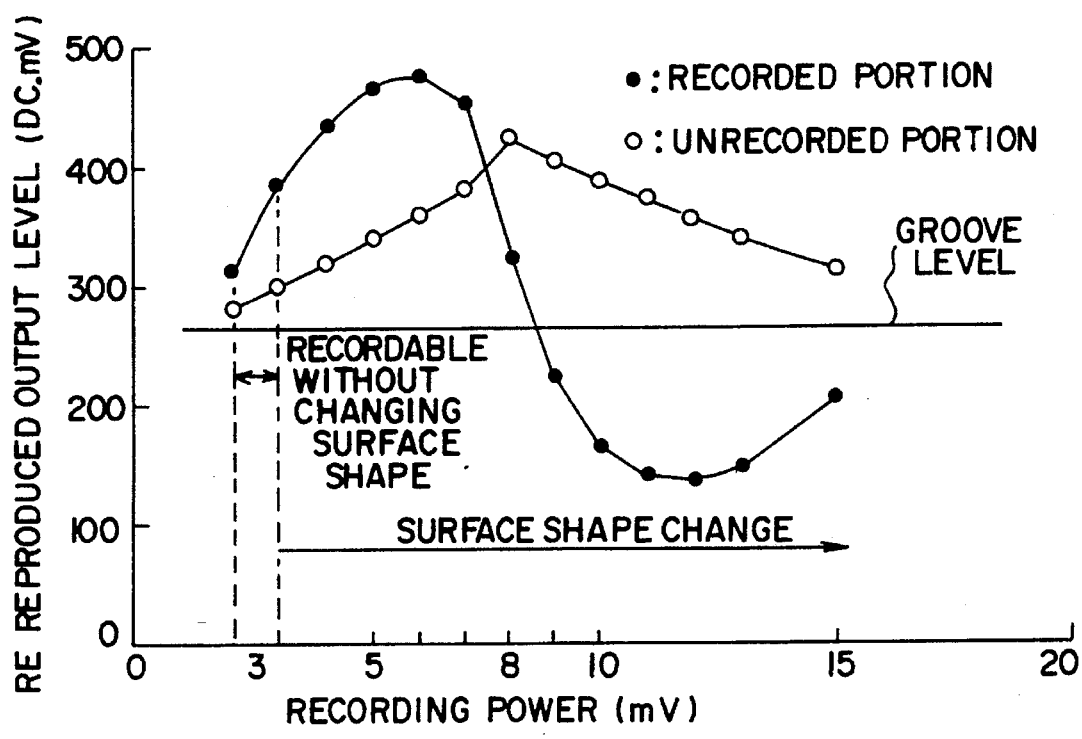
FIG. 1 is a graph showing relationships between the surface shape formed on an optical recording medium, recording power and RF reproduced output level in a test conducted by an association recording method according to the present invention.

An optical recording medium of the present invention comprises a light-transmissible substrate in the form of a disc, and a recording film coated on the substrate. Such a recording medium has a single-layer structure. Alternatively, a reflection film is coated on the recording film, and a protection film is provided for covering the reflection film.

The substrate is made of transparent material such as polycarbonate (PC) resin, polymethylmethacrylate (PMMA) resin or amorphous polyolefine (APO) resin, and formed by injection molding in consideration of productivity. A coaxial tracking pregroove or a spiral tracking pregroove is formed on the substrate at the underside.

Alternatively, the substrate may be formed by the photo-Polymer method. The thickness of the substrate is about 1.0 to 1.5 mm.

The recording film coated on the substrate contains organic coloring matter, which is reactive to be associated when the film is irradiated with the laser beam.

Aggregation is a phenomenon to aggregate 2 to 10 molecules of the same substance to behave like a single molecule. If 2 molecules are aggregated by hydrogen bonds or intermolecular force, a dimmer is formed. Such a coloring matter for example, metallic phthalocyanine coloring matter is represented by the general formula (1) as follows.

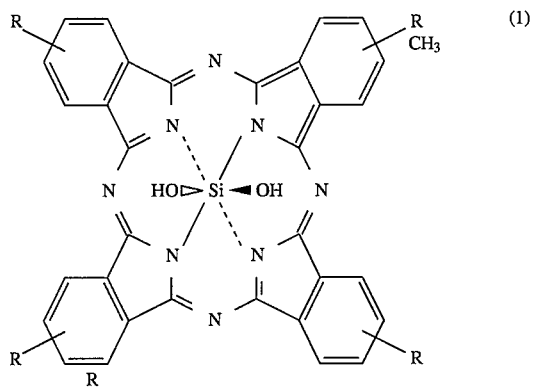

wherein R is selected from hydrogen atom, straight-chain alkyl group of carbon number 12 to 21, $SO_2NH—(CH_2)_3—N—(C_2H_5)_2$, $SO_2NH—(CH_2)_3—N—(CH_3)_2$ and $O—(CH_2)_{19}—OH$.

Other than the metallic phthalocyanine coloring matter specified by the formula (1), other coloring matters to be in the associated state when irradiated with the laser beam can be used.

In operation, the recording film is irradiated with the laser beam from the side of the substrate so that an association may take place in the coloring matter of the recording film to form a recorded portion. Since there is a difference of reflectance or transmittance between the recorded portion in the associated state and an unrecorded portion in a non-associated state, it is possible to reproduce information by detecting the difference.

The embodiment will be described in detail hereinafter.

The recording film including such a coloring matter is dissolved by a solvent and coated on the substrate by a normal method such as spin coating so that the recording film is formed. The thickness of the film is about 10 to 1000 nm.

The solvent is selected from a well known material. For example, tetrafluoropropanol, methanol, isophorone, ethyl cellosolve, methyl cellosolve, deacetone alcohol, cyclohexanone, or 1,2-dichloroethane is used.

The reflection film coated on the recording film is made of metal such as Au, Al, Ag or Cu and coated by vacuum deposition, cathode sputtering, or ion plating.

As the protection film coated on the reflection film, a resin hardened by ultraviolet ray is used and covered by spin coating. Alternatively, epoxy resin, acrylic resin, silicon or urethane resin is used.

A laser beam having the wavelength between 780 and 830 nm is properly used.

(EXAMPLE)

Making Recording Medium

Phthalocyanine coloring matter specified by the following formula (2) is melted in the solvent of diaceton alcohol to make a solution for the recording film. The solution is coated on the substrate which is made of polycarbonate (PC) and formed by injection molding having 12 cm in diameter (1.2 mm in thickness, with simple spiral tracking pregroove, TP=1.6 μm, width between 0.4 to 0.6 μm, depth of pregroove between 600 and 800 Å) by spin coating to the thickness between 600 and 1200 Å, so that the recording film is formed.

substrate, a recording film coated on the substrate, a reflection film made of Au and coated on the recording film at the thickness 1000 Å, and a protection film made of ultraviolet ray hardening acrylate resin and covered on the reflection film at the thickness about 3 μm.

Test ①

In the two samples, information is recorded and reproduced respectively under recording and reproducing conditions as follows.

A pickup in which the wavelength of the laser beam is 784 nm, and N.A. of a lens is 0.5 is used. Recording and reproducing linear velocity is between 2 m/sec and 28 m/sec. Recording power of the laser beam is between 2 mW and 18 mW, and reproducing power of the laser beam is 0.5 mW. The frequency of the recording power is determined such that the length of the recorded portion becomes 1 μm at the respective linear velocities.

Table 1 shows recording conditions in the test ① and jitters as test results.

TABLE 1

| TEST No. | RECORDING LINEAR VELOCITY (m/s) | RECORDING POWER (MW) | RECORDED SHAPE | JITTER (nsec) |
|---|---|---|---|---|
| 1 | 2 | 3 | SURFACE SHAPE UNCHANGED | 10 |
| 2 | 2 | 6 | SURFACE SHAPE CHANGED | 28 |
| 3 | 2 | 10 | SURFACE SHAPE CHANGED | 30 |
| 4 | 2 | 15 | SURFACE SHAPE CHANGED | 55 |
| 5 | 5 | 4 | SURFACE SHAPE UNCHANGED | 8 |
| 6 | 5 | 15 | SURFACE SHAPE CHANGED | 48 |
| 7 | 11 | 10 | SURFACE SHAPE UNCHANGED | 5 |
| 8 | 11 | 20 | SURFACE SHAPE CHANGED | 49 |
| 9 | 18 | 13 | SURFACE SHAPE | 3 |

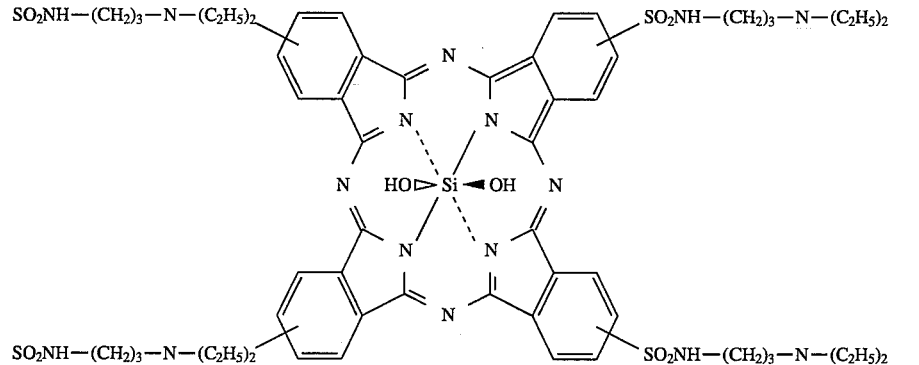

As samples of tests, two types of the recording medium were made. One of the types is so called a single layer recording medium comprising a substrate and a recording film coated on the substrate. The other type is so called a recording medium with a reflection layer which comprises a TABLE 1-continued

| TEST No. | RECORDING LINEAR VELOCITY (m/s) | RECORDING POWER (MW) | RECORDED SHAPE | JITTER (nsec) |
| --- | --- | --- | --- | --- |
| 10 | 28 | 16 | UNCHANGED SURFACE SHAPE UNCHANGED | 2 |

Test ②

Relationships between the surface shape of recorded portion and unrecorded portion on the single-layer recording medium, the recording power of the laser beam, and the RF reproduced output level was tested under the condition of the recording and reproducing linear velocity of 2 m/sec. Change of the surface shape of the recording film was observed by a microscope.

FIG. 1 shows test results. In the test ②, it was confirmed that the recorded mode changes in two steps. Namely, there is a shape unchanged mode and a shape changed mode.

If the recording power of the laser beam is 3 mW or less, the information is recorded on the recording film by an association method. When the recorded portion is irradiated with the laser beam, intensity of the reflected light is larger than that of the unrecorded portion. It is called a LOW-TO-HIGH type recording. Therefore, relative reflectance of the unrecorded portion is increased by crosstalk due to the large intensity of the reflected light.

If the recording power is increased, the area of recorded portion becomes large to increase the crosstalk, so that the intensity of total reflected light is increased.

If the recording power is 3 mW to 6 mW, the surface shape is slightly changed, caused by melting. However, the information is recorded by association method. The intensity of the reflected light on the recorded portion is further increased.

If the recording power exceeds 8 mW, holes which are called pits are formed on the recording film as a recorded portion. Thus, the reflectance at the recorded portion is reduced. It is called a HIGH-TO-LOW type recording. The intensity of the light on the unrecorded portion is also lowered by the influence of the holes.

Test ③

The same test as the test ② was conducted on the recording medium with the reflection layer.

Figure 2:
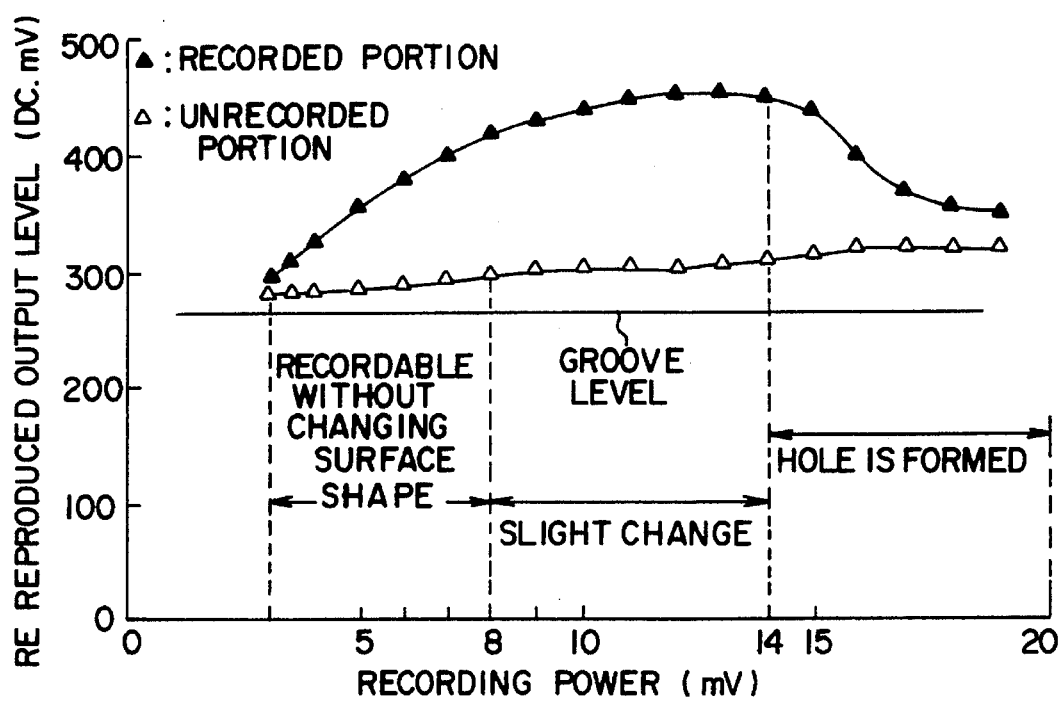
FIG. 2 is a graph showing relationships between the surface shape formed on another type of the recording medium by the association recording method, recording power and RF reproduced output level.

Test results are shown in FIG. 2. If the recording power is 8 mW or less, the information is recorded by association method. If the power is 8 mW to 14 mW, the surface shape slightly changes. If the power exceeds 14 mW, hole are formed on the recording film passing through the reflection film.

Here, comparing FIG. 1 with FIG. 2, it will be seen that the surface shape of the recording medium with reflection layer changes in a higher recording power range than the single layer recording medium. This is caused by the fact that the reflection film made of Au reduces the heat of the film, and the fact that due to the suppress effect of the two-layer construction, it is necessary to use a high recording power.

Test ④

Figure 3:
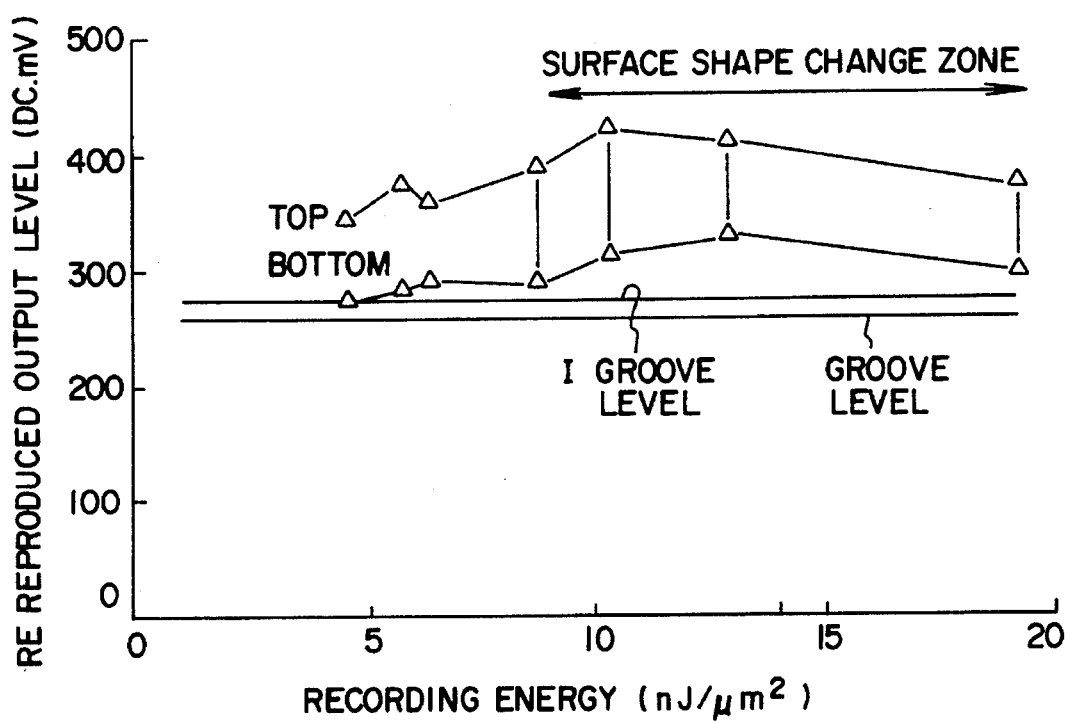
FIG. 3 is a graph showing relationships between the surface shape formed on a further type of the recording medium, recording energy and RF reproduced output level.
Figure 4:
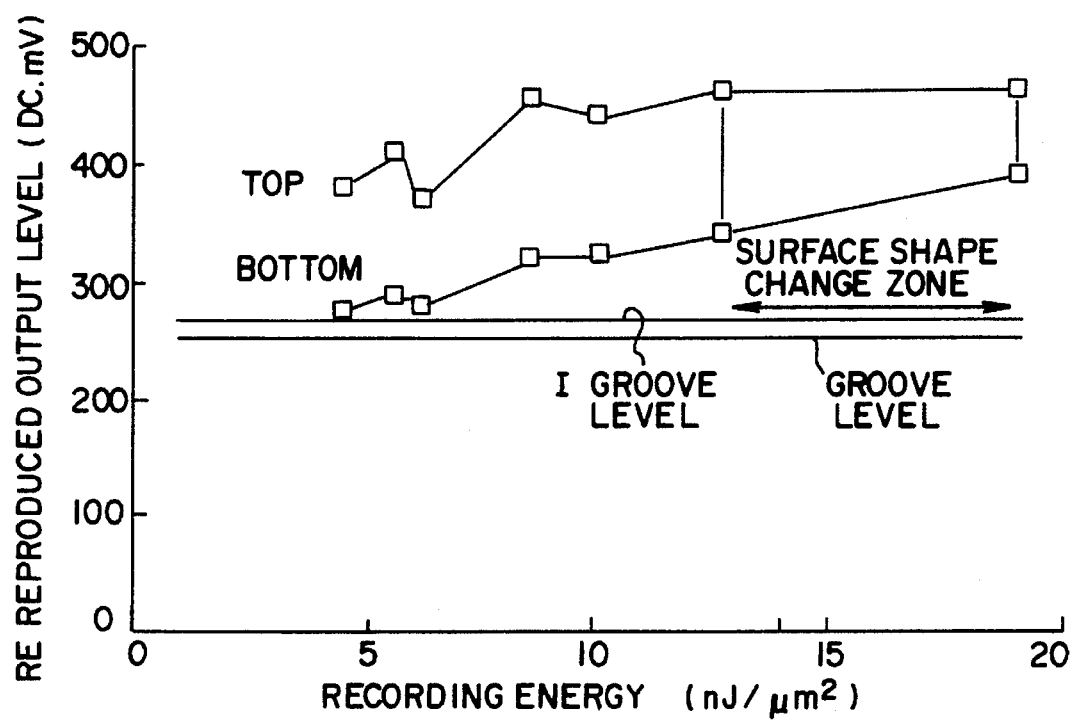
FIG. 4 is a graph showing relationships between the surface shape formed on the same recording medium as FIG. 2 by the association recording method, recording energy and RF reproduced output level.

The relationship between the surface shape, recording energy and RF output level was tested. FIG. 3 shows the test results where the recording medium is the single-layer type at the recording of information, and a reflection film and a protection film are added to the recording medium to form a recording medium with a reflection layer at the reproducing of the information. FIG. 4 shows the test results using the recording medium with the reflection layer.

As shown in FIG. 3, if the recording energy exceeds 0.9 nJ/$\mu$m$^2$, holes are formed on the recording film. In FIG. 4, if the recording energy exceeds 1.3 nJ/$\mu$m$^2$ holes are formed. The unrecorded portions are the same in FIGS. 3 and 4.

Analysis

Figure 5:
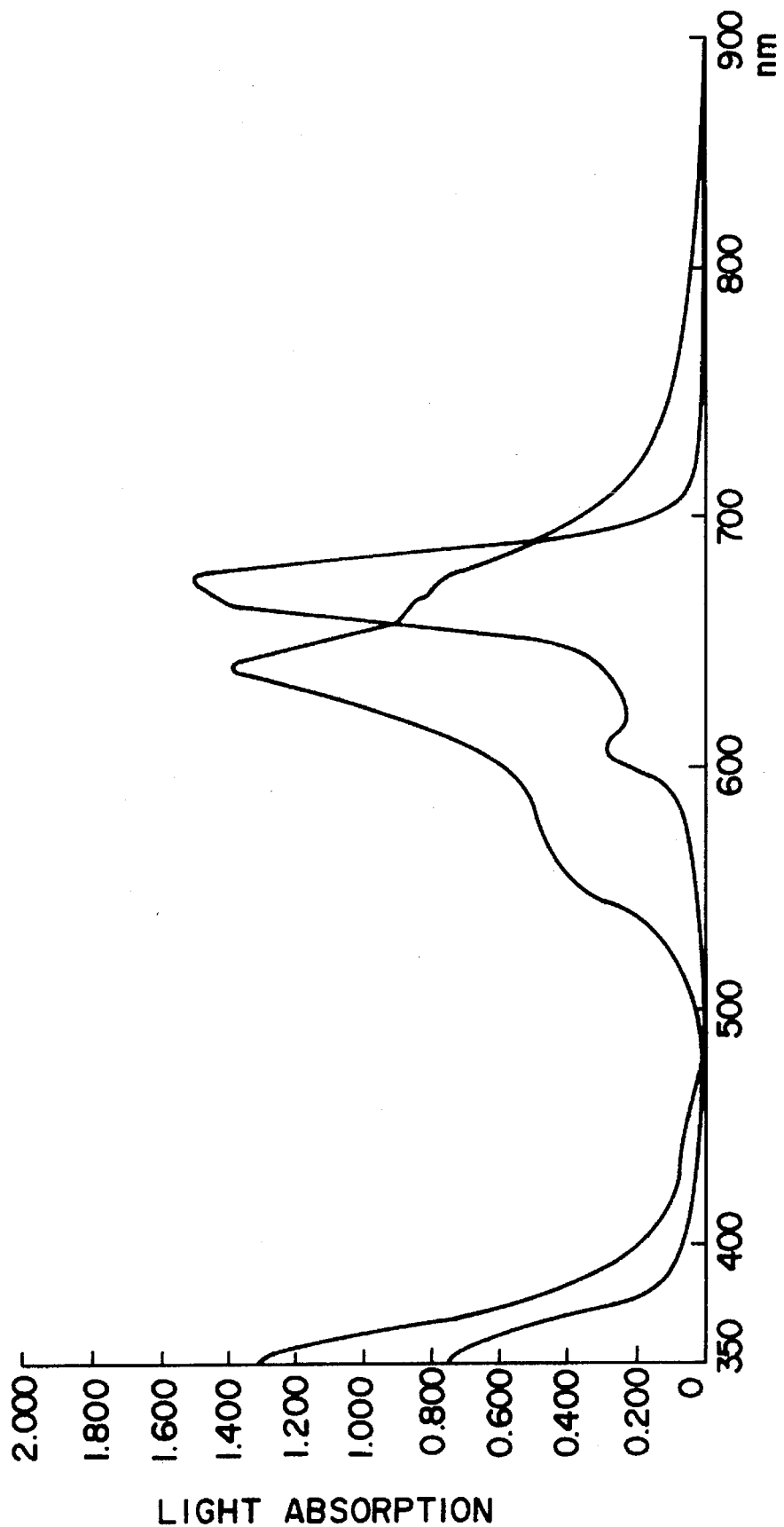
FIG. 5 is a graph showing spectral characteristics of recorded portion and unrecorded portion on the recording film of the present invention.

The component of the recording film is separated by the high-speed chromatography (HPLC) and the gas chromatography (thermal conductivity detector (TCD-GC)). Two components which are recorded portion and unrecorded portion are obtained. Each component is diluted by TFP (tetrafluoroplopanole) and spectral characteristics thereof is measured. FIG. 5 shows the results. A fine line shows spectral characteristics of the recorded portion and a bold line shows spectral characteristics of the unrecorded portion.

Although both of the spectral characteristics are clearly different from each other, it will be seen that the difference is caused by coloring matter to be associated, thereby forming dimers. Such a difference is known by the known research (see "The phthalocyanines" in volume 1, on page 61, figure 1, by Frank H. Moser and Arther L. Thomas, published by CRC publishing company in U.S.). However, the association may include trimer or more other than dimer.

Consequently, the recording principle in the recording method of the present invention is considered that alignment of molecules in the coloring matter of the recording film changes to cause the dimerization.

Figure 6:
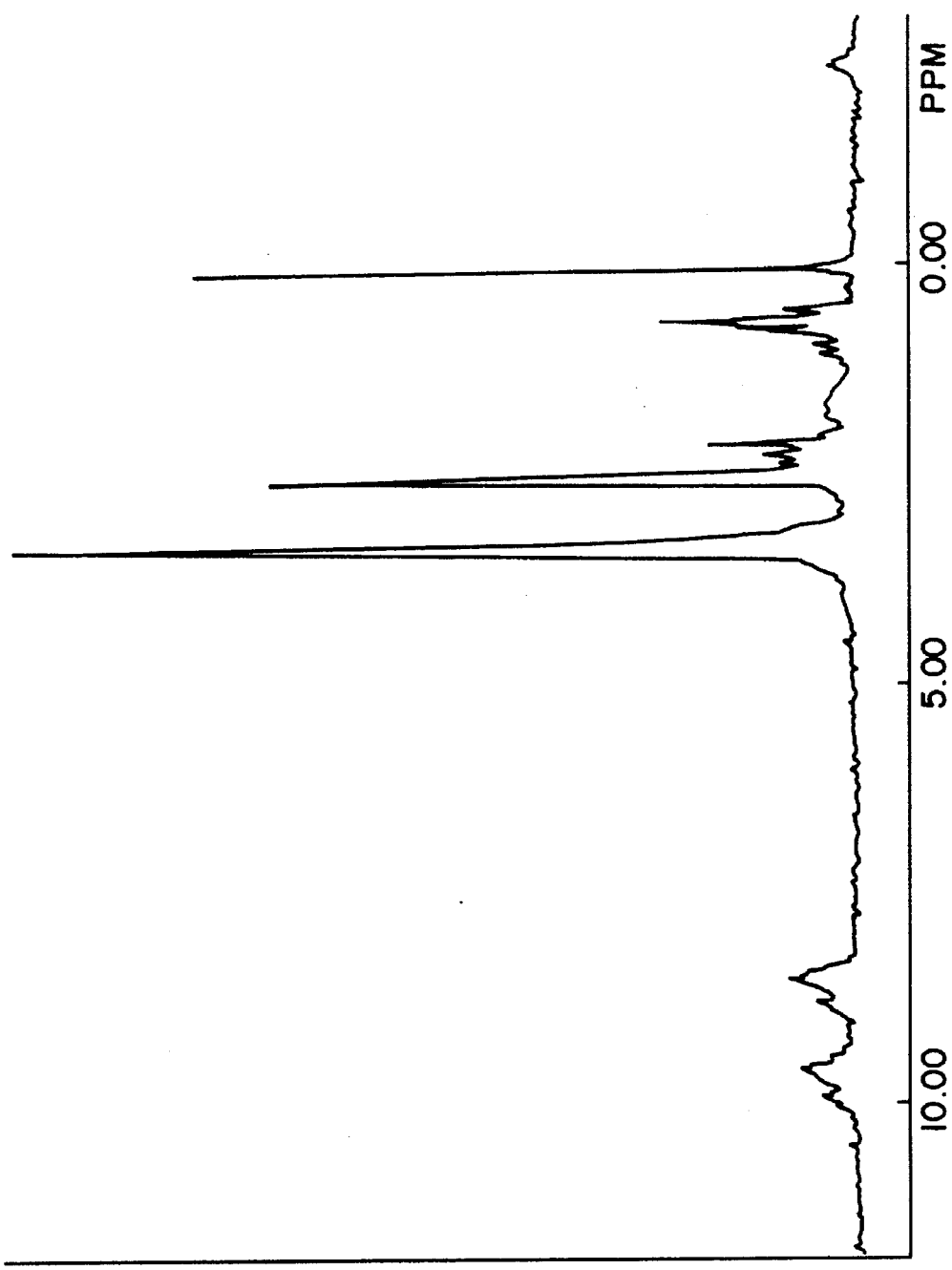
FIG. 6 is a diagram showing an NMR analysis result on the recorded portion of the recording film.
Figure 7:
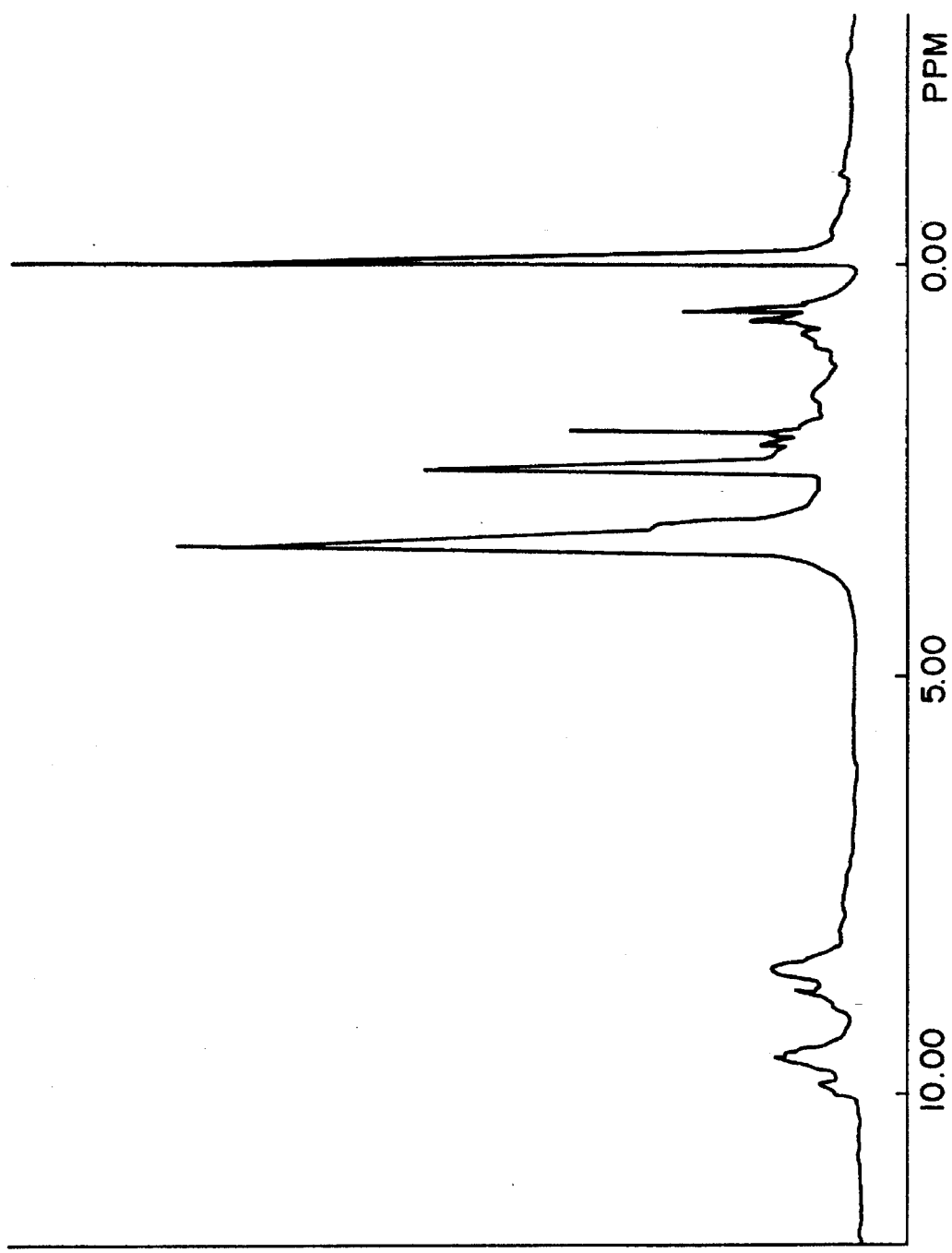
FIG. 7 is a diagram showing an NMR analysis result on the unrecorded portion of the recording film.

The recorded portion and the unrecorded portion are analyzed by NMR analysis. FIGS. 6 and 7 show the results. It will be seen that peaks of both portions coincide with each other so that there is no change in the chemical structure. Namely, during the dimerization, no chemical change such as polimerization will occur.

Examination of Results

In accordance with the present invention, information is recorded on the recording film without changing the surface shape of the film, namely without forming a pit thereon. Consequently, it will be seen from the table 1 that the information is recorded in a high recording density at a low recording power and jitter is remarkably reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A recording method for an optical recording medium having a substrate and a recording film, which contains organic coloring matter, provided on the substrate, wherein the method comprises:

irradiating the recording film with a laser beam having a recording power of 8 mW or less, passing through the substrate so that substances of the coloring matter are associated with each other.

2. The method according to claim 1 wherein the coloring matter is represented by the following formula:

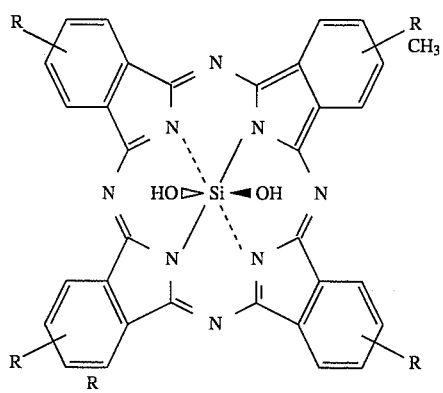
(1)

wherein R is selected from hydrogen atom, straight-chain alkyl group of carbon number 12 to 21, $SO_2NH-(CH_2)_3-N-(C_2H_5)_2$ $SO_2NH-(CH_2)_3-N-(CH_3)_2$ AND $O-(CH_2)_{19}-OH$.

3. The method according to claim 1 wherein the coloring matter is represented by the following formula:

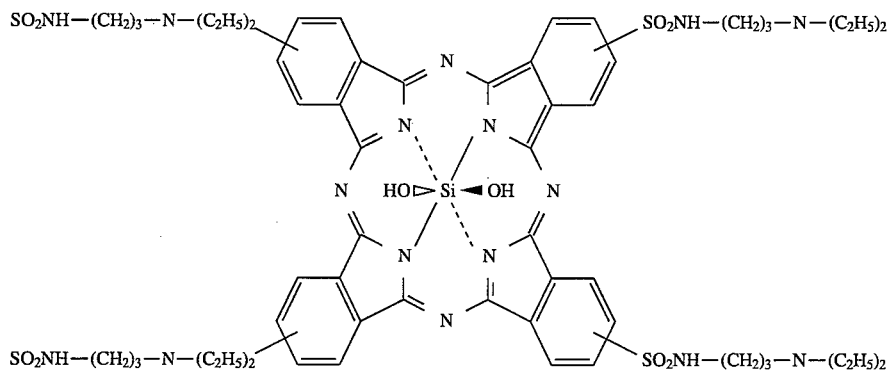
(2)

4. A recording method for an optical recording medium having a substrate, a recording film, which contains organic coloring matter, provided on the substrate, a reflection film and a protecting film, wherein the method comprises:

irradiating the recording film with a laser beam having a recording power of 8 mW or less, passing through the substrate so that substances of the coloring matter are associated with each other.

5. The method according to claim 4 wherein the coloring matter is represented by the following formula:

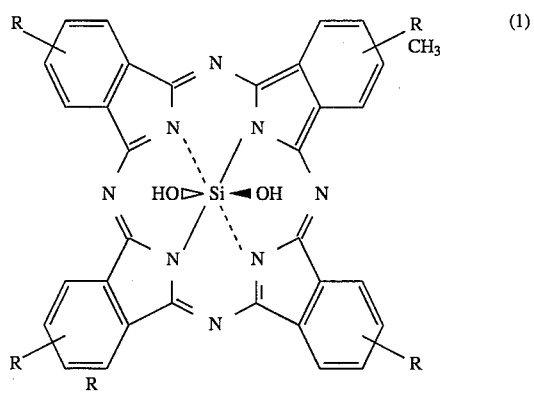
(1)

wherein R is selected from hydrogen atom, straight-chain alkyl group of carbon number 12 to 21, $SO_2NH-(CH_2)_3-N-(C_2H_5)_2$ $SO_2NH-(CH_2)_3-N-(CH_3)_2$ AND $O-(CH_2)_{19}-OH$.

6. The method according to claim 4 wherein the coloring matter is represented by the following formula:

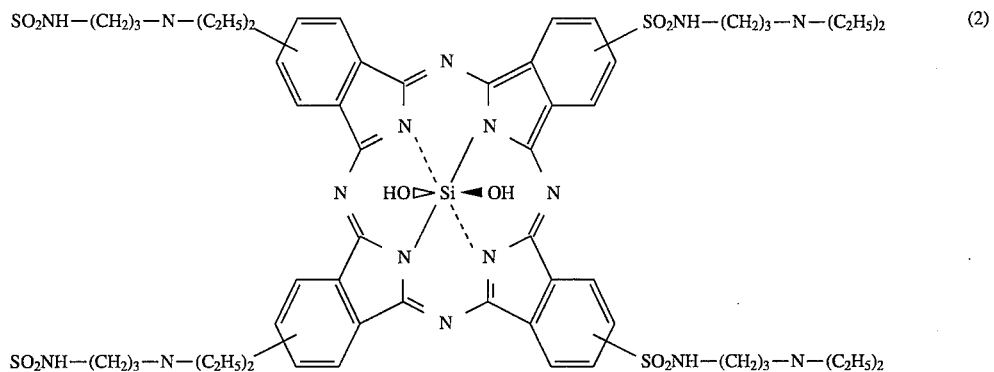
(2)
\* \* \* \* \*